United States Patent
Burdgick

(10) Patent No.: US 6,722,850 B2
(45) Date of Patent: Apr. 20, 2004

(54) ENDFACE GAP SEALING OF STEAM TURBINE PACKING SEAL SEGMENTS AND RETROFITTING THEREOF

(75) Inventor: Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 10/199,480

(22) Filed: Jul. 22, 2002

(65) Prior Publication Data

US 2004/0013522 A1 Jan. 22, 2004

(51) Int. Cl.[7] ................................................ F01D 11/02
(52) U.S. Cl. ...................... 415/230; 415/138; 415/139; 415/174.2; 415/174.5; 29/401.1; 29/402.02; 29/402.03; 29/889.1; 277/416
(58) Field of Search ................................ 415/136, 138, 415/139, 174.2, 174.5, 173.5, 230, 231; 277/409, 411, 412, 416; 29/889.1, 401.1, 402.02, 402.03, 402.04, 402.06

(56) References Cited

U.S. PATENT DOCUMENTS

| | | | | |
|---|---|---|---|---|
| 4,537,024 A | * | 8/1985 | Grosjean | 60/791 |
| 5,158,430 A | * | 10/1992 | Dixon et al. | 415/134 |
| 5,509,669 A | * | 4/1996 | Wolfe et al. | 277/654 |
| 5,586,773 A | * | 12/1996 | Bagepalli et al. | 277/650 |
| 5,624,227 A | | 4/1997 | Farrell | |
| 5,868,398 A | * | 2/1999 | Maier et al. | 277/643 |
| 5,934,687 A | | 8/1999 | Bagepalli et al. | |
| 5,971,400 A | * | 10/1999 | Turnquist et al. | 277/416 |
| 6,053,699 A | * | 4/2000 | Turnquist et al. | 415/231 |
| 6,162,014 A | * | 12/2000 | Bagepalli et al. | 415/170.1 |
| 6,648,332 B1 | * | 11/2003 | Burdgick | 277/303 |

FOREIGN PATENT DOCUMENTS

JP     59-505 A   *   1/1984   ............ 415/174.5

* cited by examiner

Primary Examiner—Christopher Verdier
(74) Attorney, Agent, or Firm—Nixon & Vanderhye

(57) ABSTRACT

Spline seals are disposed in circumferentially registering slots of adjacent arcuate sealing segments disposed in grooves of the casing of a steam turbine about a rotor. The spline seals extend in the gap between the endfaces of the segments and minimize or preclude steam leakage past the endfaces. The spline seals may be oriented axially or inclined radially to minimize leakage paths in the radial inclined and axial directions, respectively. The spline seals are disposed in the slots which may be formed as part of original equipment manufacture or may be machined in segments with the spline seals provided as retrofits.

20 Claims, 3 Drawing Sheets

ENDFACE GAP SEALING OF STEAM TURBINE PACKING SEAL SEGMENTS AND RETROFITTING THEREOF

BACKGROUND OF THE INVENTION

The present invention relates generally to seals between circumferentially registering endfaces of packing seal segments in a steam turbine and particularly relates to spline seals between endfaces of packing seal segments circumferentially disposed end-to-end in a stationary packing casing of the steam turbine and methods of retrofitting the spline seals.

In a steam turbine, there are circumferentially extending packing seal segments disposed in the packing or stationary casing at opposite ends of the turbine and in sealing relation with the rotor. In certain steam turbines, the packing seal segments are provided intermediate pressure opposite ends of the rotor between high and intermediate turbine sections. These packing seal segments minimize or preclude steam leakage from the rotor ends or through leakage paths between the high and intermediate pressure sections of the steam turbine within the stationary casing. It will be appreciated that the sealing segments extend circumferentially and have endfaces in circumferential registration with one another. The endfaces of the sealing segments are not sealed to one another and the resulting steam leakage flows detrimentally impact overall machine performance. Further, it is not possible to maintain zero clearance between the segment endfaces for a number of reasons, including manufacturing tolerances which dictate a gap to accommodate the tolerance range. Additionally, machine thermal transients may cause the segments to bind in assembly, even if designed line to line. Further, most seal segments are movable radially inwardly and outwardly. This requires a gap between the segment endfaces, at least in radially outermost positions of the segments. Further, if the casing surrounding the rotor goes out of round, the gaps may become large in one location versus another location. Still further, if the casing grows thermally more than the packing segments, then the end gaps may increase in dimension relative to the cold condition of the turbine. Steam leakage flows between endfaces of packing seal segments have therefore become a significant problem, and, accordingly, there is a need for minimizing leakage paths for steam past the endfaces of circumferential packing seal segments in a steam turbine.

BRIEF DESCRIPTION OF THE INVENTION

In accordance with a preferred embodiment of the present invention, there are provided circumferentially extending packing ring segments disposed in a packing casing surrounding the rotor. The segments have spline seals between the circumferentially registering endfaces for minimizing leakage flow past the endfaces. The registering endfaces of adjacent segments are provided with grooves for receiving portions of the spline seal. The spline seal may comprise a flat sheet metal plate extending between circumferentially registering grooves arranged either in a generally axial direction to preclude radial leakage flow or at an angle to or normal to the turbine axis to preclude axial leakage flow. The spline seals per se may be wrapped with metallic cloth. The spline seals may also have enlargements at opposite ends for seating in the bases of the registering grooves. Thus, the central portion of the spline seal bridging the gap between the segments is spaced from the sides of the grooves, and enables relative movement of the segments in a direction normal to the spline seal without binding or severing of the spline seal.

The sealing ring segments are employed at opposite ends of the steam turbine at axially spaced locations from the turbine section. Thus, the spline seals between endfaces of the sealing segments preclude axial leakage flow outwardly of the turbine section. The spline seals may also be utilized with seal segments disposed between high and intermediate pressure turbine sections to minimize leakage from the high pressure section to the intermediate pressure section.

A particular advantage of the present invention resides in the ability to retrofit the spline seals to existing steam turbines as a means of improving overall machine performance. To accomplish this, and during a normal outage for maintenance, the upper outer casing of the turbine is removed and the existing seal segments are rolled from the turbine casing. Slots are machined in the endfaces to receive the spline seals. The segments are then rolled back into the upper and lower outer casings with the spline seals inserted between opposing endfaces, thereby reducing steam leakage paths in existing steam turbines after the retrofit.

In a preferred embodiment according to the present invention, there is provided a steam turbine comprising a rotor having a steam turbine section, a stationary casing surrounding the rotor including the steam turbine section, the casing carrying a plurality of circumferentially extending packing seal segments about the casing at a seal location axially spaced from the turbine section for sealing between the casing and the rotor, each of the segments having endfaces respectively in circumferential registry with opposed endfaces of circumferentially adjacent segments, the endfaces including slots opening circumferentially and in general circumferential registration with one another and a spline seal extending between each of the opposed endfaces of circumferentially adjacent segments and in the slots for minimizing or precluding steam leakage past the registering endfaces.

In a further preferred embodiment according to the present invention, there is provided a steam turbine comprising a rotor having a steam turbine section, a stationary casing surrounding the rotor including the steam turbine section, the casing having a circumferentially extending dovetail-shaped groove carrying a plurality of circumferentially extending packing seal segments about the casing in the groove, the segments carrying labyrinth seal teeth for sealing about the rotor, each of the segments having endfaces respectively in circumferential registry with opposed endfaces of circumferentially adjacent segments, the endfaces including slots opening circumferentially and generally in circumferential registration with one another and a spline seal extending between each of the opposed endfaces of circumferentially adjacent segments and in the slots for minimizing or precluding steam leakage past the registering endfaces.

In a further preferred embodiment according to the present invention, there is provided in a turbine having a rotor, a stationary casing surrounding the rotor and a plurality of circumferentially extending packing ring segments in circumferentially extending grooves about the casing for sealing between the casing and the rotor, a method of retrofitting the packing ring segments to provide seals between the opposed endfaces of adjacent packing ring segments comprising the steps of removing the packing ring segments from the turbine, forming at least one slot in each endface of the removed packing ring segments, disposing a spline seal in slots of opposed endfaces of the packing ring segments and inserting the packing ring segments into the grooves of the casing whereby the spline seals extend between adjacent segments for minimizing or precluding steam leakage flows between the adjacent segments.

DETAILED DESCRIPTION OF THE INVENTION

Figure 1:
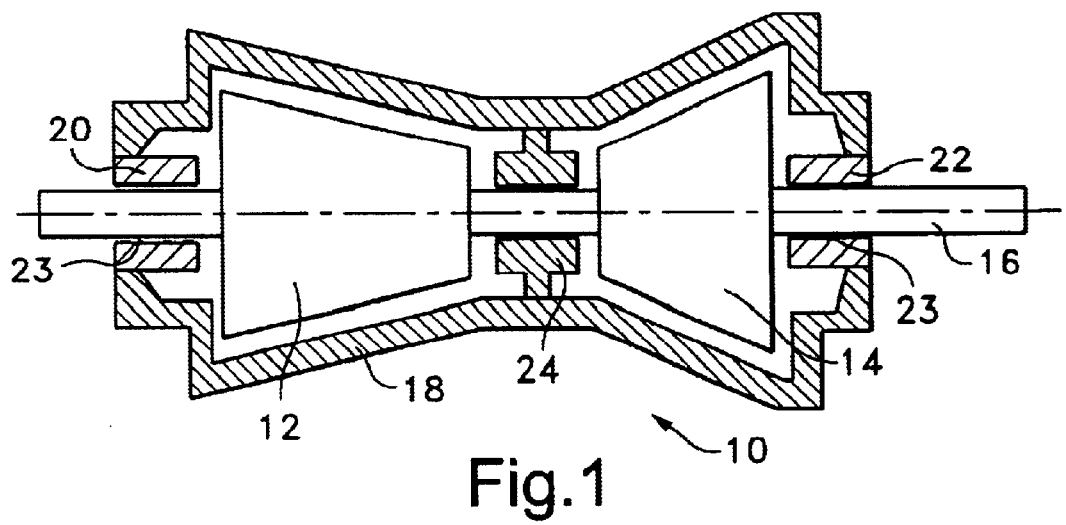
FIG. 1 is a schematic illustration of a steam turbine having high and intermediate pressure turbine sections.

Referring now to the drawings, particularly to FIG. 1, there is illustrated a steam turbine, generally designated 10, and in this example comprised of a high pressure turbine section 12 and an intermediate pressure turbine section 14 mounted on a single integral rotor 16 extending beyond opposite ends of the steam turbine casing 18. It will be appreciated that the rotor 16 is driven in rotation by the high and intermediate pressure turbine sections 12 and 14, while the casing 18 remains stationary. Circumferentially extending packing seal segments are located in the stationary casing 18 at opposite ends 20 and 22 of casing 18, i.e., at locations 23 spaced axially from the turbine sections 12 and 14. In the illustrated turbine having high and intermediate turbine pressure sections, additional circumferentially extending packing ring segments are disposed about the shaft 16 intermediate the high and intermediate pressure sections 12 and 14, respectively, of the turbine at 24. It will be appreciated that the spline seals on endfaces of packing ring segments may be used on other types of steam turbines and at locations other than as set forth in the disclosed embodiments of a steam turbine.

Figure 2:
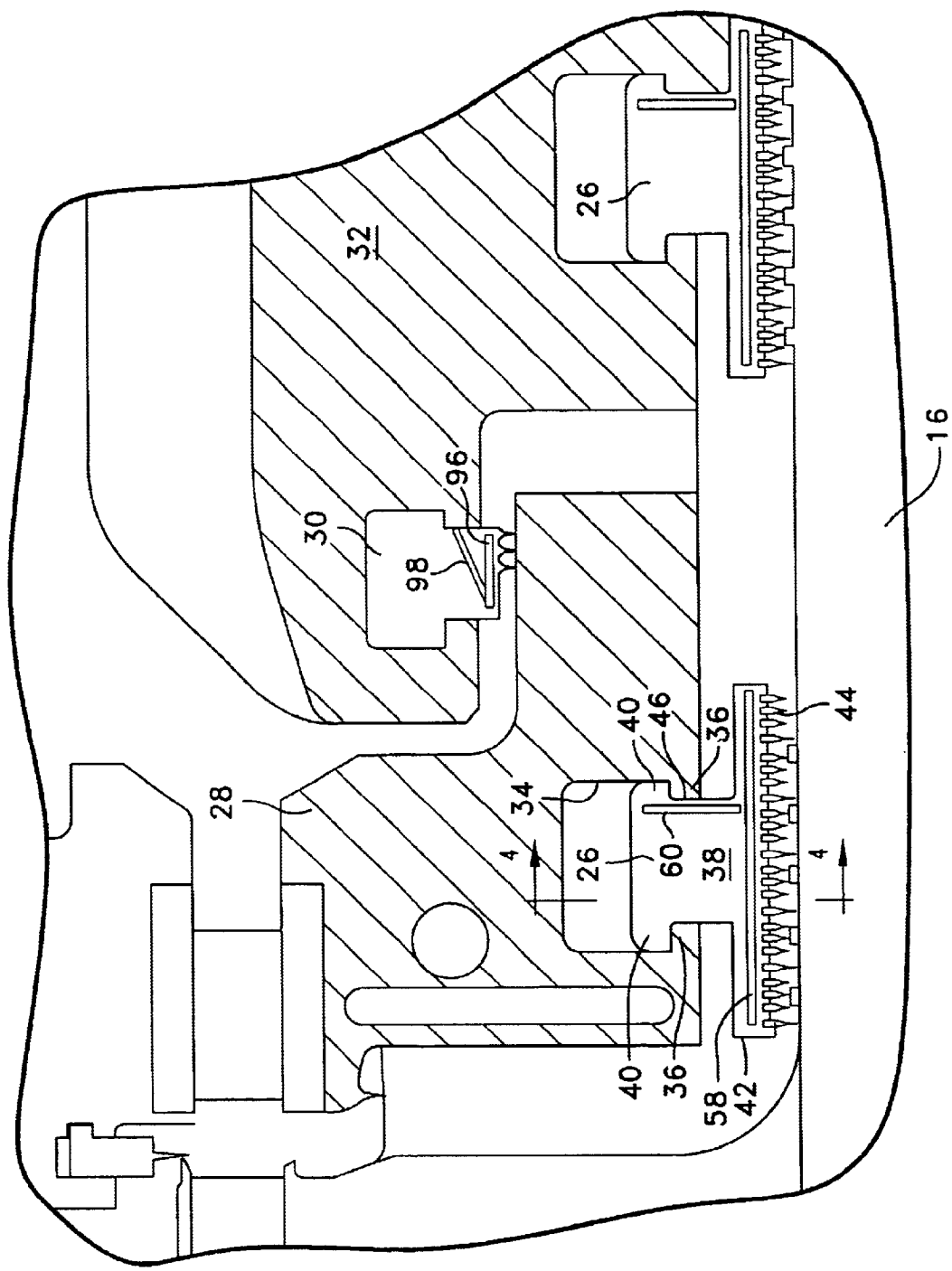
FIG. 2 is a fragmentary enlarged partial cross-sectional view through the rotor and casing illustrating spline seals in the endfaces of packing ring segments according to the present invention.

Referring now to FIG. 2, packing ring segments 26 are disposed between a stationary casing 28, e.g., corresponding to the steam turbine casing 18, and the rotor 16. Additional packing rings 30 are disposed between two stationary components 28 and 32 of the turbine casing and a description of one segment 26 will suffice as a description for all.

Each arcuate packing ring segment 26 is disposed in an arcuate dovetail-shaped groove 34 of the casing 28, the groove 34 having opposed axially directed hooks 36. Each circumferential sealing segment includes a neck portion 38 disposed between hooks 36, oppositely directed hooks 40 for engaging the hooks 36 of the stationary casing and an arcuate flange 42 extending from neck portion 38 in opposite axial directions. Flange 42 mounts a plurality of labyrinth teeth 44 for sealing along the outside surface of the rotor 16. In the illustrated example of FIG. 2, the high pressure side of the packing ring segment 26 is to the left of the segment 26 whereby the axial facing and arcuate radial surface 46 of segment 26 butts axially against the opposing axial face of hook 36, forming a seal. As illustrated, the packing ring segments 26 are movable in a radial direction, as is well known, and collectively form an annular seal ring about the rotor.

Figure 3:
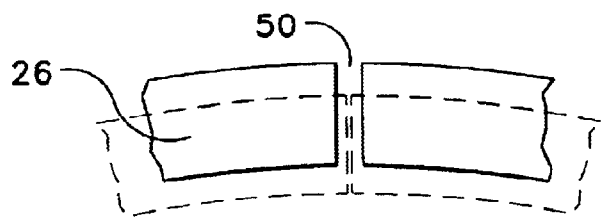
FIG. 3 is a fragmentary schematic axial illustration of circumferentially registering endfaces of a sealing segment at different radial positions illustrating the different gaps between the endfaces.

It will be appreciated that any number of packing seal segments can be disposed circumferentially about the dovetail-shaped grooves 34. For example, three or more segments may be disposed in the upper half of the casing 28 and a like number disposed in the lower half of casing 28. It will be appreciated that in such arrangement six endface gaps 50 (FIG. 3) appear between the circumferentially adjacent segments 26. In FIG. 3, a pair of adjacent seal segments 26 are illustrated as viewed axially along the turbine centerline, with their radial movement indicated by the full and dashed lines, respectively. Thus, the gap 50 between adjacent sealing segments varies dependent upon the radial location of the sealing.

Figure 4:
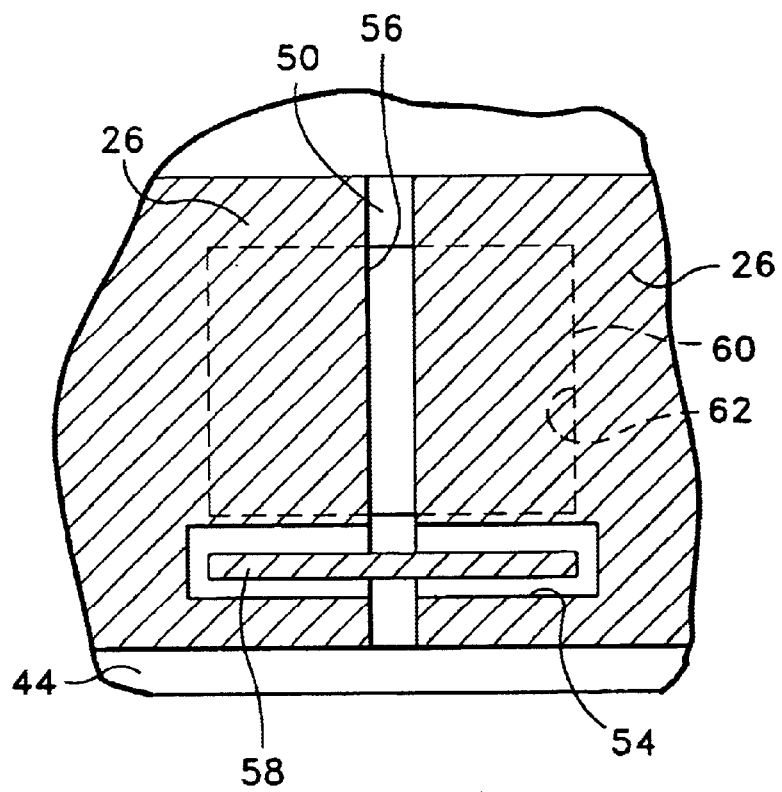
FIG. 4 is an enlarged cross-sectional view taken generally about on line 4—4 in FIG. 2.
Figure 5:
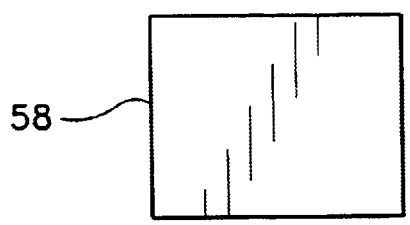
FIG. 5 is a plan view of a spline seal.

In accordance with a preferred embodiment of the present invention, spline seals are disposed between the circumferentially registering endfaces of adjacent seal segments 26. For example, and referring to FIG. 4, grooves or slots 54 are disposed in each of the endfaces 56 of adjacent circumferentially extending segments 26. The slots 54 register circumferentially with one another and receive a spline seal 58 spanning the gap 50 between the endfaces 56. The spline seal may comprise a flat metal plate, as illustrated in FIG. 5, which is of generally rectilinear shape. The thickness of the plate is less than the depth of the slots 54 to accommodate relative radial movement of the segment, e.g., accommodating highs and lows on the rotor. It will be appreciated from a review of FIGS. 2 and 4 that the spline seal 58 extends along the majority of the length of the flange 42 in an axial direction and between opposite endfaces of adjacent seal segments 26. As a consequence of this arrangement, any steam leakage path in a radial direction between the endfaces of adjacent segments is minimized or precluded.

In addition, another or second spline seal 60 may be disposed between the endfaces of adjacent segments 26. The spline seal 60 (FIGS. 2 and 4) is disposed in circumferential registering, generally radially outwardly extending grooves or slots 62 formed in the endfaces 56, preferably adjacent the downstream end of the segment 26. Thus, the spline seal 60 extends generally radially and minimizes or precludes leakage flow in an axial direction through the gap 50 between circumferentially adjacent segments 26.

It will be appreciated that the endface gap seals for the sealing segments in accordance with this invention may be provided as part of original equipment manufacture or retrofitted into existing machinery. For example, to retrofit the spline seal, an existing steam turbine is torn down, i.e., the upper outer and inner casings are removed and the sealing segments are removed, i.e., by rolling them circumferentially from the grooves 34 of the inner casings. Grooves, e.g., grooves 54 and 62, are then formed in the endfaces of the sealing segments to receive the spline seals. With the grooves formed, the segments can be rolled back into the dovetail grooves 34 of the inner casings with the spline seals, e.g., seals 58 and 60, inserted in the grooves between adjacent endfaces. Alternatively, of course, new packing ring segments with the grooves already formed may be used in lieu of forming grooves in the removed packing ring seal segments.

Figure 6:
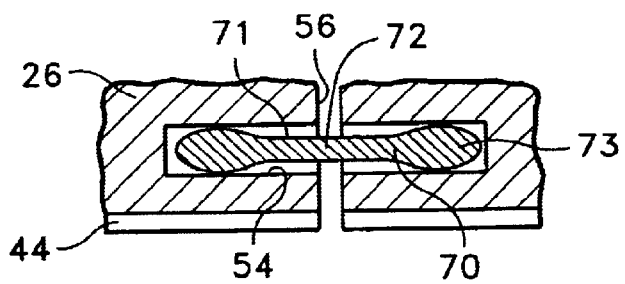
FIG. 6 is a fragmentary cross-sectional view of a different form of spline seal.

Referring now to FIG. 6, another form of spline seal 70 is illustrated in a slot or groove, for example, slot 54, in the circumferentially opposed endfaces 56 of segments 26. The spline seal 70 may have a seal body 71 with enlargements 73 along opposite edges of the seal for disposition adjacent the bases of the grooves. Thus, the central portion 72 of seal body 71 has a reduced depth dimension in comparison with the width of the slot 54 and the enlarged ends, facilitating relative movement of the segments 26 in a radial direction without damaging the spline seal 70. Spline seal 70 may be of the type disclosed in commonly-owned U.S. Pat. No. 5,624,227, the disclosure of which is incorporated herein by reference.

Figure 7:
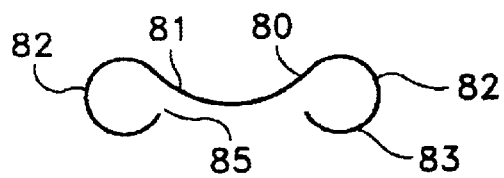
FIG. 7 is a schematic illustration of a still further form of spline seal.

Referring to FIG. 7, another form of spline seal is illustrated. The spline seal 80 of FIG. 7 may be formed of a sheet metal material having a seal body 81 with opposite ends reversely curved or bent at 82 to form enlargements 83 along opposite sides of the spline seal 80. Edges 85 of the reversely curved portions face the central portion of the seal body 81. The enlargements 83, like the enlargements 71 of spline seals 70 of FIG. 5, are disposed adjacent the bases of the slots 54 and facilitate relative movement in a radial direction of the seal segments 26. This type of spline seal is also disclosed in the above patent.

Figure 8:
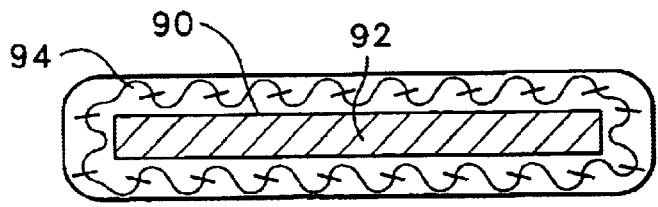
FIG. 8 is an enlarged cross-sectional view of a spline seal illustrating a metallic cloth covering therefor.

In FIG. 8, there is illustrated a spline seal 90 having a central core 92 formed of metal and having an overlay of cloth 94 about at least a pair of opposite edges thereof. The cloth layer may comprise a metal, ceramic and/or polymer fibers which have been woven to form a layer of fabric. The overlying cloth may be of the type disclosed in commonly-owned U.S. Pat. No. 5,934,687, the disclosure of which is incorporated herein by reference.

It will be appreciated from the foregoing that spline seals are provided in the gaps between the circumferentially registering endfaces of arcuate sealing segments and are disposed in grooves of a steam turbine casing surrounding a rotor. Additionally, the spline seal segments may be used in packing ring segments disposed between two static casings as illustrated in FIG. 2. As illustrated in FIG. 2, for example, spline seals 96 and 98 extend generally axially and at an incline, respectively, to the axis of the turbine. The spline seal 96 minimizes or precludes steam leakage in a radial direction while the spline seal 98 minimizes or precludes steam leakage in radial and axial directions. Spline seals 96 and 98 may take the form of any one of the various forms of spline seals illustrated herein. In all cases, any steam leakage paths are minimized, improving machine performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A steam turbine comprising:
   a rotor having a steam turbine section;
   a stationary casing surrounding the rotor including the steam turbine section;
   said casing carrying a plurality of circumferentially extending packing seal segments about said casing at a seal location axially spaced from said turbine section for sealing between the casing and the rotor, said segments being movable radially relative to said casing;
   each of said segments having endfaces respectively in circumferential registry with opposed endfaces of circumferentially adjacent segments, said endfaces including slots opening circumferentially and in general circumferential registration with one another; and
   a generally flat non-resilient spline seal extending between each of said opposed endfaces of circumferentially adjacent segments and in said slots for minimizing or precluding steam leakage past said registering endfaces, said spline seal having a circumferential dimension less than the circumferential distance between bases of said slots respectively to accommodate the radial movement of the segments relative to the casing.

2. A turbine according to claim 1 wherein each said spline seal extends generally in axial and tangential directions for sealing against leakage flows in generally radial directions.

3. A turbine according to claim 1 wherein said spline seal extends generally in radial and circumferential directions for sealing against leakage flows in a generally axial direction.

4. A turbine according to claim 1 wherein each said sealing segment has a plurality of axially spaced labyrinth seal teeth for sealing with the rotor.

5. A turbine according to claim 1 wherein the spline seals extend generally in axial and tangential directions for sealing against leakage flows in generally radial directions and second spline seals extend between the opposed endfaces of circumferentially adjacent segments, said second spline seals extending generally in radial and circumferential directions for sealing against leakage flows in a generally axial direction.

6. A turbine according to claim 1 wherein said casing has a circumferentially extending groove having an axially extending hook, each said segment having a hook for radially overlying the casing hook, said casing hook and said segments having axially facing seal surfaces on a downstream side of said segment, said spline seals extending generally in axial and tangential directions for sealing against leakage flows in generally radial directions.

7. A turbine according to claim 6 wherein second spline seals extend generally in radial and circumferential directions for sealing against leakage flows in a generally axial direction, said second spline seals being disposed adjacent sides of said segments thereof adjacent said axially facing seal surfaces of said segments.

8. A turbine according to claim 1 wherein each said spline seal includes a cloth surrounding said spline seal along opposite sides thereof and about at least a pair of opposite edges thereof.

9. A turbine according to claim 1 wherein each said spline seal comprises a seal body having an enlargement along opposite edges and received in said slots with the enlargements adjacent bases of said slots, respectively.

10. A steam turbine comprising:
    a rotor having a steam turbine section;
    a stationary casing surrounding the rotor including the steam turbine section;
    said casing having a circumferentially extending dovetail-shaped groove carrying a plurality of circumferentially extending packing seal segments about said casing in said groove, said segments carrying labyrinth seal teeth for sealing about said rotor, said segments being movable radially relative to said casing;
    each of said segments having endfaces respectively in circumferential registry with opposed endfaces of circumferentially adjacent segments, said endfaces including slots opening circumferentially and generally in circumferential registration with one another; and
    a generally flat non-resilient spline seal extending between each of said opposed endfaces of circumferentially adjacent segments and in said slots for minimizing or precluding steam leakage past said registering endfaces, said spline seal having a circumferential dimension less than the circumferential distance between bases of said slots respectively to accommodate the radial movement of the segments relative to the casing.

11. A turbine according to claim 10 wherein each said spline seal extends generally in axial and tangential directions for sealing against leakage flows in generally radial directions.

12. A turbine according to claim 10 wherein each said spline seal extends generally in radial and circumferential directions for sealing against leakage flows in a generally axial direction.

13. A turbine according to claim 10 wherein each spline seal extends generally in axial and tangential directions for sealing against leakage flows in generally radial directions and a second spline seal extends between each of said opposed endfaces of circumferentially adjacent segments, said second spline seal extending generally in radial and circumferential directions for sealing against leakage flows in a generally axial direction.

14. A turbine according to claim 10 wherein said circumferentially extending groove has an axially extending hook, each said segment having a hook for radially overlying the segment hook, said casing hook and said segments having axially facing seal surfaces on downstream sides of said segments, said spline seals extending generally in axial and tangential directions for sealing against leakage flows in generally radial directions.

15. A turbine according to claim 10 wherein said circumferentially extending groove has an axially extending hook, each said segment having a hook for radially overlying the segment hook, said casing hook and said segments having axially facing seal surfaces on downstream sides of said segments, said spline seals extending generally in radial and circumferential directions for sealing against leakage flows in a generally axial direction, said spline seals being disposed adjacent a side of said segment thereof adjacent said axially facing seal surface of said segments.

16. A turbine according to claim 10 wherein said spline seals include a cloth surrounding each said spline seal along opposite sides thereof and about at least a pair of opposite edges thereof.

17. A turbine according to claim 10 wherein each said spline seal comprises a seal body having an enlargement along opposite edges and received in said slots with the enlargements adjacent bases of said slots, respectively.

18. In a turbine having a rotor, a stationary casing surrounding the rotor and a plurality of circumferentially extending packing ring segments in circumferentially extending grooves about said casing for sealing between the casing and the rotor, a method of retrofitting the packing ring segments to provide seals between the opposed endfaces of adjacent packing ring segments comprising the steps of:

removing the packing ring segments from the turbine;

forming at least one slot in each endface of the removed packing ring segments;

disposing a spline seal in slots of opposed endfaces of the packing ring segments; and inserting the packing ring segments into the grooves of the casing whereby the spline seals extend between adjacent segments for minimizing or precluding steam leakage flows between said adjacent segments.

19. A method according to claim 18 including forming two slots in each endface of the removed packing ring segments, and disposing a spline seal in each slot of the opposite endfaces whereby the two spline seals extend between the adjacent segments in assembly of the segments in the turbine.

20. A method according to claim 19 including forming one of said two slots in the endfaces in a generally axial direction, and forming another of said two slots in the endfaces in a generally radial direction, and disposing the spline seals in said slots to minimize or preclude leakage flows in generally radial and axial directions respectively.

* * * * *